T. TANAKI.
AUTOMOBILE SIGNAL.
APPLICATION FILED SEPT. 24, 1919.
1,356,839.
Patented Oct. 26, 1920.
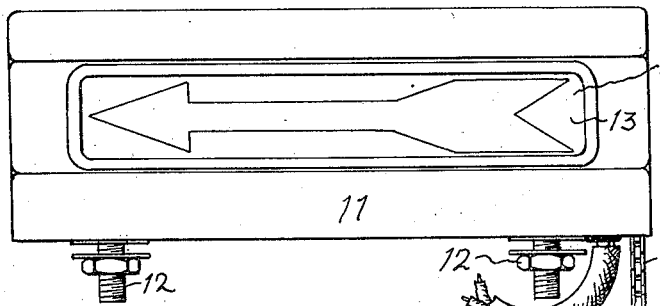
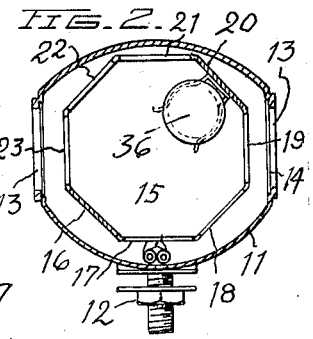
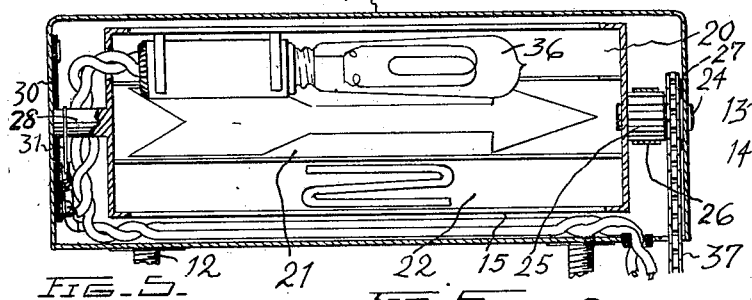
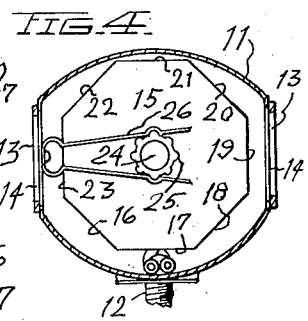
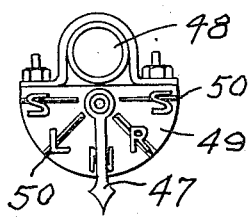
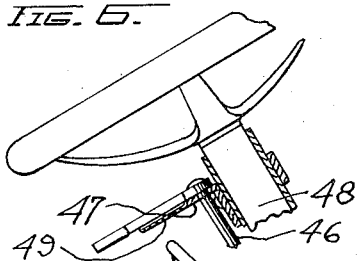
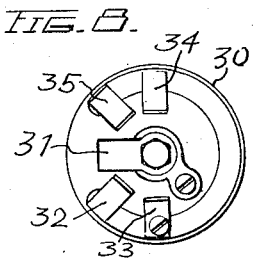
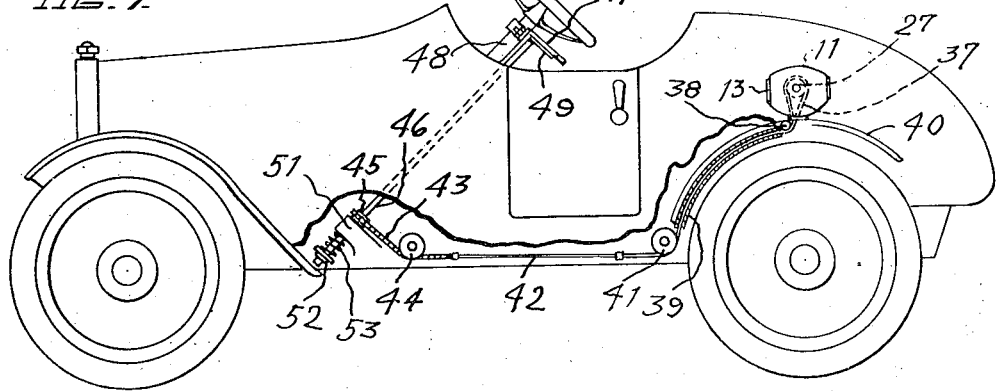
Inventor: Tomoaki Tanaki
By His Atty: Edward M Kojima

UNITED STATES PATENT OFFICE.

TOMOAKI TANAKI, OF LOS ANGELES, CALIFORNIA.

AUTOMOBILE-SIGNAL.

1,356,839.   Specification of Letters Patent.   Patented Oct. 26, 1920.

Application filed September 24, 1919. Serial No. 326,028.

*To all whom it may concern:*

Be it known that I, TOMOAKI TANAKI, a subject of the Emperor of Japan, residing in the city and county of Los Angeles and State of California, have invented a new and useful Automobile-Signal, of which the following is a specification.

The hereinafter described invention relates to an improved means for signaling the intended route of vehicles, and particularly to devices which may be attached to automobiles so that the signals displayed may be viewed simultaneously from the front and rear of the vehicle.

The objects of this invention are to provide a simple device of this character, adaptable for application to any automobile, accessible for manipulation by the automobile driver, capable of displaying signals discernible from the front and rear, and capable of indicating a plurality of signals relating to traffic movement of the vehicle.

Other objects and advantages may appear from the subjoined detail description.

Upon the annexed drawings, Figure 1 is a side elevation of a vehicle traffic signal embodying the principles of my invention. Fig. 2 is a sectional view of the same. Fig. 3 is a longitudinal sectional view of the same. Fig. 4 is a cross-sectional view showing the spring holder for the signal. Fig. 5 is a plan view of the control lever. Fig. 6 is a detail view showing the control lever applied to a steering-wheel post. Fig. 7 is a side elevation of an automobile showing my invention applied thereto. Fig. 8 is a detail plan view of the electric switch adapted to control the illumination of the signal.

Referring to the drawings, the container 11 is preferably mounted on the automobile in a conspicuous position, preferably at one side of the wind-shield, or on a rear-wheel fender, so that the signals will be simultaneously displayed so as to be seen from the front and rear of the vehicle.

The container is provided with clamps 12 for attachment to an automobile, and has front and rear apertures 13, provided with transparent closures 14. The signal consists of a box having eight sides, arranged so that oppositely disposed sides will display the same characters; the sides 16 and 20 being blank, sides 17 and 21 displaying arrows pointing to the right, sides 18 and 22, displaying the letter "S," signifying to stop, and sides 19 and 23, displaying arrows pointing to the left. Box 15 is provided with a trunnion shaft 24, having an eight-toothed wheel 25, engaging with a spring clamp 26, and provided with a sprocket-wheel 27. The box 15 is provided with a trunnion shaft 28, on the opposite end, both trunnion shafts being journaled in the container. A switch 30 is mounted on the inner wall, being provided with the movable blade 31, normally in a non-contact position, but, on rotation of the signal box, forming a circuit through the contact members 32, 33, 34, or 35, to illuminate the bulb 36, within the box.

On sprocket-wheel 27 is mounted a chain 37, passing over suitable idlers 38, through a curved tube 39 beneath the wheel fender 40, thence passing over idlers 41, and connected to rods 42. A similar chain 43, connected to rods 42, extends over the idlers 44, and over a sprocket-wheel 45, fixed on shaft 46. At the upper end of shaft 46 is a handle 47. Secured to the steering post 48, is a sector member 49, provided with radial grooves 50, and suitably marked with characters indicating the neutral, right, left, and stop positions of the signal device.

In use, the handle 47 is normally in neutral position, in which the switch 30 is open, and the bulb 36 deënergized, the blank sides 16 and 20, of the signal box 15, being in display position. If the car driver wishes to turn the car in either direction, as for example, to the right, the driver will move the handle 47 to the right, and over the character "R," thereby, through the chain and rod connection, turning the box 15 so that the arrow pointing to the right, will be displayed. Simultaneously, upon rotation of the box 15, the switch 30 is closed, and the signal displayed is illuminated. The shaft 46 is journaled at the bottom, in a bearing-box 51, and is provided with a fixed collar 52, the spring 53, being interposed between the collar and bearing box, and serving to maintain the handle in engagement with the grooves 50. The signal will therefore remain in position until the handle is again manipulated by the driver. Similarly, in turning to the left, or for stopping or slowing the speed of the automobile, the driver will turn the handle to the appropriate position.

The device as shown and described embodies but one form of the invention, and it is understood that such changes may be made as may fall within the scope of the appended claim.

What is claimed is:

In a vehicle signal device, a housing, a revolving signal member mounted within the housing and provided with a plurality of signals, a sprocket wheel in axial alinement with the signal member and adapted to rotate therewith, a sector member provided with grooves corresponding with the signal displaying positions of said signal member, a bearing member, a shaft journaled in the bearing member and sector member, a handle fixed to the shaft, a collar fixed to the opposite end of the shaft, a spring interposed between the collar and said bearing member and adapted to maintain said handle in engagement with the grooves in the sector member, a sprocket wheel mounted on the shaft, a connecting element extending around said sprocket wheels to cause synchronous rotation of the handle and the revolving signal member, and spring clamp members adapted to maintain the signal member in any of its signal displaying positions.

In testimony whereof, I hereunto affix my signature this 16th day of September, in the year 1919.

TOMOAKI TANAKI.